US011161692B2

(12) United States Patent
Casavant

(10) Patent No.: US 11,161,692 B2
(45) Date of Patent: Nov. 2, 2021

(54) METHOD AND SYSTEM FOR GENERATING RFID LABELS USING RFID ENCODER ATTACHMENT

(71) Applicant: FLEXSTR8, INC., El Segundo, CA (US)

(72) Inventor: Eric Pun Casavant, El Segundo, CA (US)

(73) Assignee: FLEXSTR8, INC., El Segundo, CA (US)

(*) Notice: Subject to any disclaimer, the term of this patent is extended or adjusted under 35 U.S.C. 154(b) by 227 days.

(21) Appl. No.: 16/496,232

(22) PCT Filed: Mar. 21, 2018

(86) PCT No.: PCT/US2018/023531
§ 371 (c)(1),
(2) Date: Sep. 20, 2019

(87) PCT Pub. No.: WO2018/175558
PCT Pub. Date: Sep. 27, 2018

(65) Prior Publication Data
US 2020/0290807 A1  Sep. 17, 2020

Related U.S. Application Data

(60) Provisional application No. 62/601,396, filed on Mar. 21, 2017.

(51) Int. Cl.
*G06F 7/00* (2006.01)
*B65G 1/137* (2006.01)
*B41J 3/407* (2006.01)

(52) U.S. Cl.
CPC .......... *B65G 1/1373* (2013.01); *B41J 3/4075* (2013.01); *B65G 2203/046* (2013.01)

(58) Field of Classification Search
CPC ............ B65G 1/1373; B65G 2203/046; B41J 3/4075; B41J 3/50; G06K 1/121; G06K 1/20
(Continued)

(56) References Cited

U.S. PATENT DOCUMENTS 6,593,853 B1 * 7/2003 Barrett .................. G06K 1/121
340/572.1
8,896,425 B1   11/2014 Martin
(Continued)

FOREIGN PATENT DOCUMENTS

EP         2352113 B1     9/2014

*Primary Examiner* — Yolanda R Cumbess
(74) *Attorney, Agent, or Firm* — One LLP

(57) ABSTRACT

The present disclosure provides a system and method for generating RFID labels using a non-RFID label printer and an easy-to-attach RFID encoder. The RFID encoder comprises an RFID controller coupled to a network, one or more antennas, a label detector, and an RFID reader. The RFID encoder can be packed into two or more encoder units that are clipped onto the front and back of the non-RFID label printer. The RFID controller receives a packet of reader settings and a packet (array) of encode data via the one or more antennas. As unprinted labels pass through the non-RFID label printer and the RFID encoder, the label detector senses tags of the unprinted labels, and triggers the RFID controller and the non-RFID label printer to encode RFIDs onto the tags.

20 Claims, 13 Drawing Sheets

(58) Field of Classification Search
USPC .............................. 700/213, 215, 225, 227
See application file for complete search history.

(56) References Cited

U.S. PATENT DOCUMENTS

| | | | |
|---|---|---|---|
| 2006/0071063 A1* | 4/2006 | Duckett | G06K 1/128 |
| | | | 235/375 |
| 2006/0131377 A1* | 6/2006 | Zimmerman | G06K 17/00 |
| | | | 235/375 |
| 2010/0103238 A1* | 4/2010 | Neuhard | B65C 11/021 |
| | | | 347/109 |
| 2020/0290807 A1* | 9/2020 | Casavant | B41J 3/50 |

* cited by examiner

METHOD AND SYSTEM FOR GENERATING RFID LABELS USING RFID ENCODER ATTACHMENT

CROSS-REFERENCE TO RELATED APPLICATION

This application is a U.S. National Stage application under 35 U.S.C. § 371 of International Application No. PCT/US2018/023531, filed Mar. 21, 2018, which claims priority to U.S. Provisional Application 62/601,396, filed on Mar. 21, 2017, the disclosures of both of which are incorporated herein by reference in their entireties.

FIELD OF THE INVENTION

The disclosure generally relates to generating RFID labels.

BACKGROUND

Ultra High Frequency (UHF) Radio Frequency Identification (RFID) tags are commonly used for inventory tracking, storing data relevant to the product and origin, similar to barcodes. However, RFID tags have several benefits which make them an invaluable addition or replacement of barcodes. For example, whereas barcodes are read out optically and their data is fixed once created, RFID tags contain memory which is read wirelessly when interrogated by a UHF RFID reader, making their data more private and dynamic. Memory sectors can be updated, locked, and destroyed by users, depending on their administrative privileges.

RFID tags are often distributed as "RFID labels," which are regular printable labels with RFID tags embedded inside them. The labels feature a barcode or relevant graphics, and have corresponding data encoded in the embedded RFID tags. Conventionally, these labels are created in small batches using "RFID Printer Encoders," which are normal label printers with integrated RFID encoders. These devices both print and encode RFID labels on demand.

However, RFID printer encoders are sold at a premium, and often lack in performance and capabilities of standalone label printers. Furthermore, if a company would like to introduce RFID intelligence to their business, but have already invested in regular label printers, it may be uneconomical to reinvest in a new fleet or RFID printer encoders.

SUMMARY

Systems and methods, in accordance with various examples of the present disclosure, provide a solution to the above-mentioned problems by generating RFID labels using a non-RFID label printer and an easy-to-attach RFID encoder. The RFID encoder comprises an RFID controller coupled to a network, one or more antennas, a label detector, and an RFID reader. The RFID encoder can be packed into two or more encoder units that are clipped onto the front and back of the non-RFID label printer. The RFID controller receives a packet of reader settings and a packet (array) of encode data via the one or more antennas. As unprinted labels pass through the non-RFID label printer and the RFID encoder, the label detector senses tags of the unprinted labels, and triggers the RFID controller and the non-RFID label printer to encode RFIDs onto the tags.

In accordance with one aspect of the present disclosure, a computer-implemented method for generating RFID labels using a non-RFID label printer and an RFID encoder that comprises an RFID controller, one or more antennas, a label detector, and an RFID reader, comprises: causing the RFID encoder to be armed; receiving, via the one or more antennas, reader settings, encode settings, and encode data; sensing, using the label detector, a specific tag of unprinted labels; encoding the specific tag with a corresponding RFID based upon the encode data; determining that the encoding of the specific tag is not successful; recording a tag index of the specific tag as bad; and initiating a bad label process.

In some implementations, the encoder may further comprise a marker label detector, and a marker apparatus. In some examples, the marker apparatus is a hole punch apparatus.

In some examples, the bad label process comprises: determining the tag index of the specific tag is bad; causing the marker apparatus to be armed; sensing the specific tag via the marker label detector; and marking the specific tag using the marker apparatus.

In some implementations, the computer-implemented method for generating RFID labels further comprises a synchronization process between the non-RFID label printer and the RFID encoder. The synchronization process comprises: receiving, via the one or more antennas, encode settings and encode data; checking the encode data to determine a corresponding tag ID (TID) of a current tag sensed by the label detector; retrieving a TID list based upon the current TID; arming the encoder; and sending print data to the non-RFID label printer to generate the RFID labels.

In some implementations, the RFID encoder further comprises one or more clips to attach to the non-RFID label printer (e.g., Epson™ 7500). The one or more clips are configured to accommodate at least one physical feature of the non-RFID label printer. For example, the one or more clips are adapted to a rear feed lip of the non-RFID label printer, a front exit lip of the non-RFID label printer, and/or expansion ports of the non-RFID label printer. In some implementations, the RFID encoder can include multiple RFID readers. The RFID readers can be embedded in a label unwinder or rewinder of the non-RFID label printer.

In some implementations, the RFID controller of the RFID encoder can intercept printing and encoding jobs from non-RFID label software (e.g., bartender and loftware). A user of the RFID encoder can use common non-RFID label creation software to generate RFID labels.

In some implementations, the label detector of the RFID encoder only senses one specific tag of RFID labels at a time. Tag singulation (isolation) can be important to ensuring the specific tag being encoded with a correct RFID. In some examples, a window shield is used for the tag singulation. The window shield is capable of being adjusted to accommodate various tag sizes.

In accordance with another aspect of the present disclosure, a non-transitory computer-readable storage medium storing instructions is provided. The instructions, when executed by a processor of an RFID encoder that comprises an RFID controller, one or more antennas, a label detector, and an RFID reader, cause the processor to perform operations including: causing the RFID encoder to be armed; receiving, via the one or more antennas, reader settings, encode settings, and encode data; sensing, using the label detector, a specific tag of unprinted labels; encoding the specific tag with a corresponding RFID based upon the encode data; determining that the encoding of the specific tag is not successful; recording a tag index of the specific tag as bad; and initiating a bad label process.

Additional features and advantages of the disclosure will be set forth in the description which follows, and in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. These drawings depict only example aspects of the disclosure and are not therefore to be considered to be limiting of its scope. The principles herein are described and explained with additional specificity and detail through the use of the accompanying drawings in which.

DETAILED DESCRIPTION

Figure 1A:
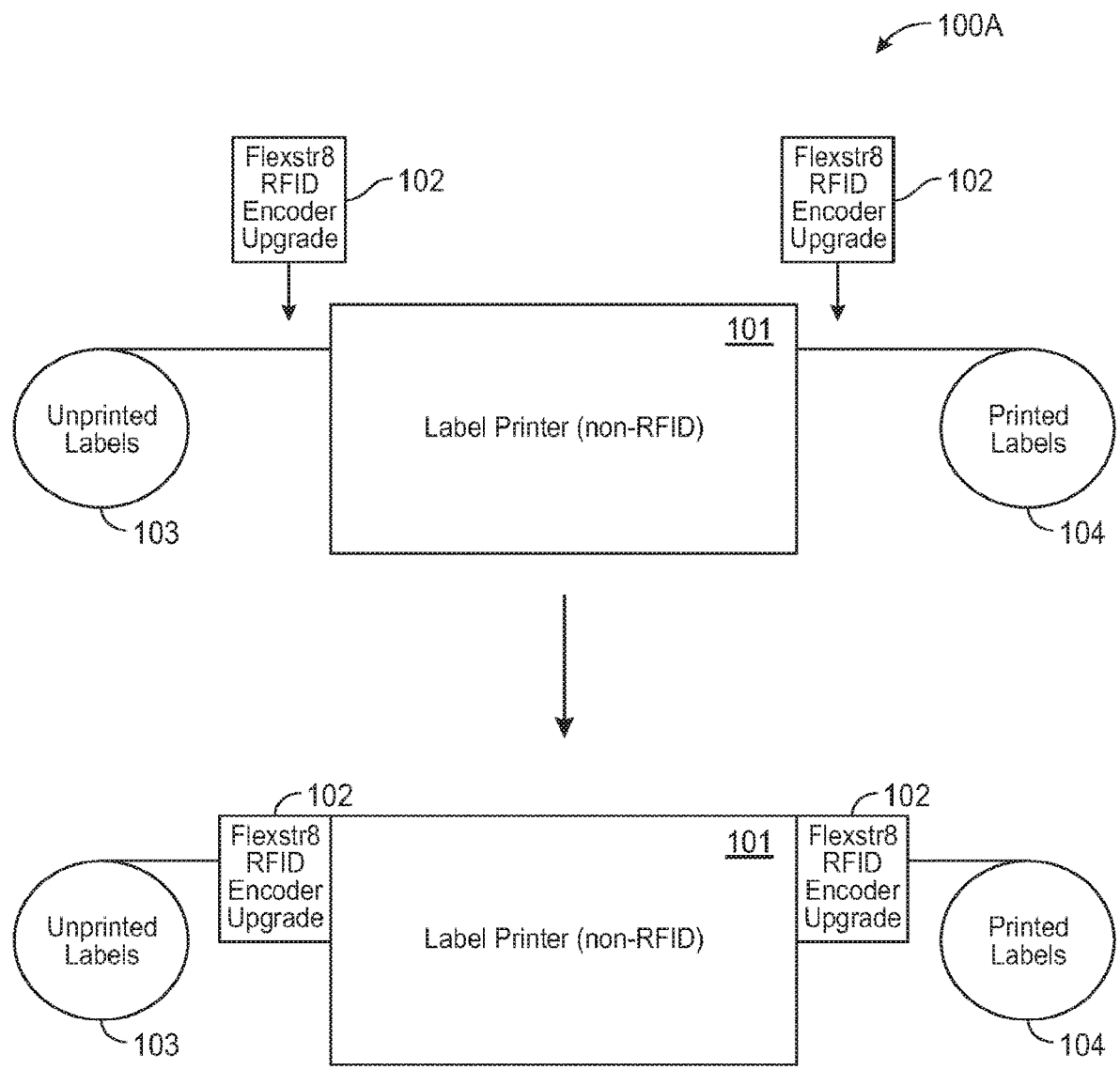
FIG. 1A is a schematic block diagram illustrating an exemplary RFID encoder attached to a non-RFID label printer, in accordance with an implementation of the present disclosure.

The present disclosure can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Various examples of the present disclosure provide systems and methods for generating RFID labels using a non-RFID label printer and an easy-to-attach RFID encoder. The RFID encoder comprises an RFID controller coupled to a network, one or more antennas, a label detector, and an RFID reader. The RFID controller receives a packet of reader settings and a packet (array) of encode data via the one or more antennas. As unprinted labels pass through the non-RFID label printer and the RFID encoder, the label detector senses tags of the unprinted labels, and triggers the RFID controller and the non-RFID label printer to encode RFID onto the tags.

FIG. 1A is a schematic block diagram 100A illustrating an exemplary RFID encoder 102 attached to a non-RFID label printer 101, in accordance with an implementation of the present disclosure. In this example, the RFID encoder 102 can be packed into two or more encoder units that are clipped onto the front and back of the non-RFID label printer. As unprinted labels 103 pass through the non-RFID label printer 101 and the RFID encoder 102, the RFID encoder 102 senses tags of the unprinted labels 103, and encode RFIDs onto the tags.

Figure 1B:
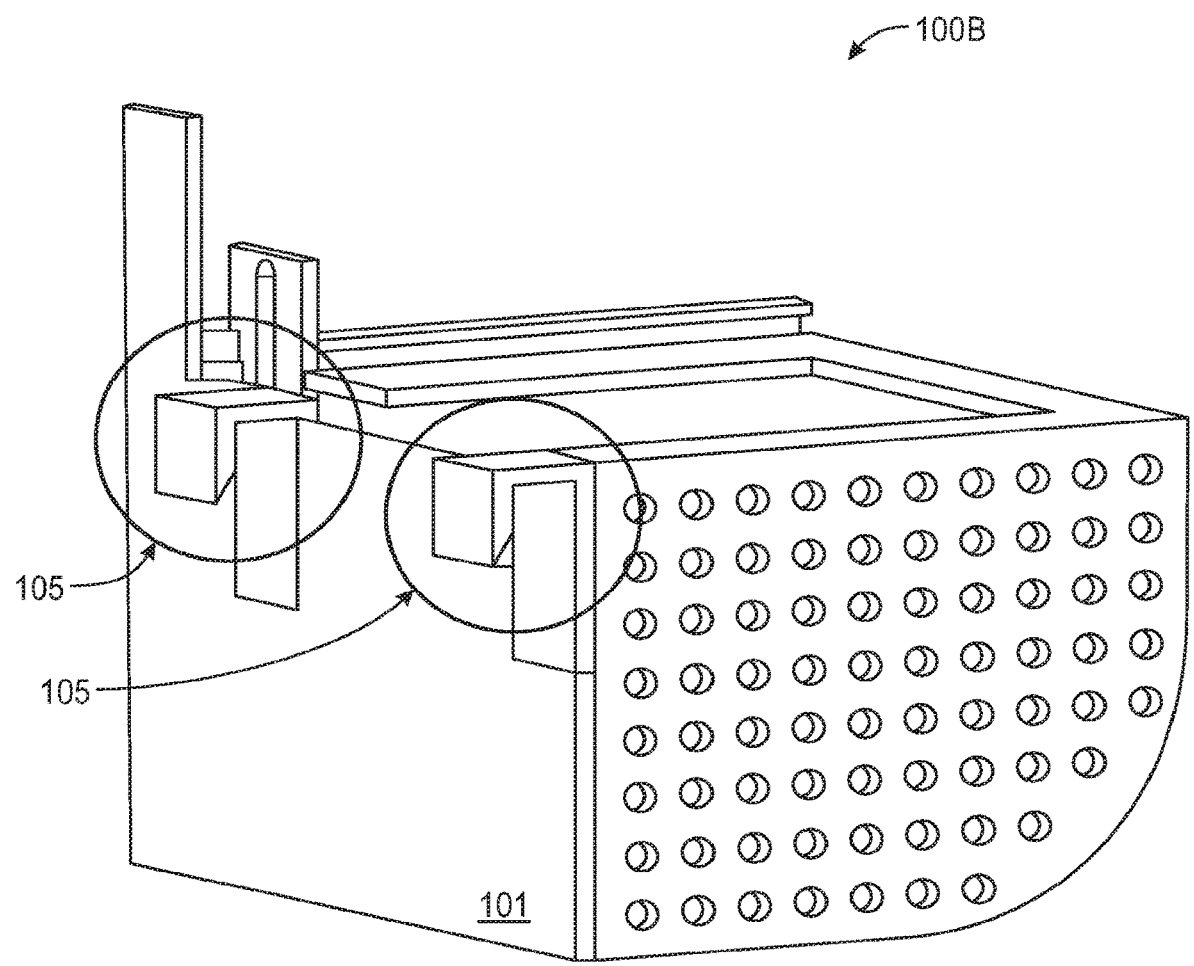
FIG. 1B is a schematic block diagram illustrating example positions that the exemplary RFID encoder can be attached to the non-RFID label printer, in accordance with an implementation of the present disclosure.

FIG. 1B is a schematic block diagram illustrating example positions 105 that the exemplary RFID encoder can be attached to the non-RFID label printer 101, in accordance with an implementation of the present disclosure. In some examples, the RFID encoder comprises one or more clips to attach to the non-RFID label printer 101. The one or more clips are configured to accommodate at least one physical feature of the non-RFID label printer 101. For example, the one or more clips are adapted to a rear feed lip of the non-RFID label printer 101, a front exit lip of the non-RFID label printer 101, and/or expansion ports of the non-RFID label printer 101. In some implementations, the RFID encoder can include multiple RFID readers. The RFID readers can be embedded in a label unwinder or rewinder of the non-RFID label printer 101.

Figure 2:
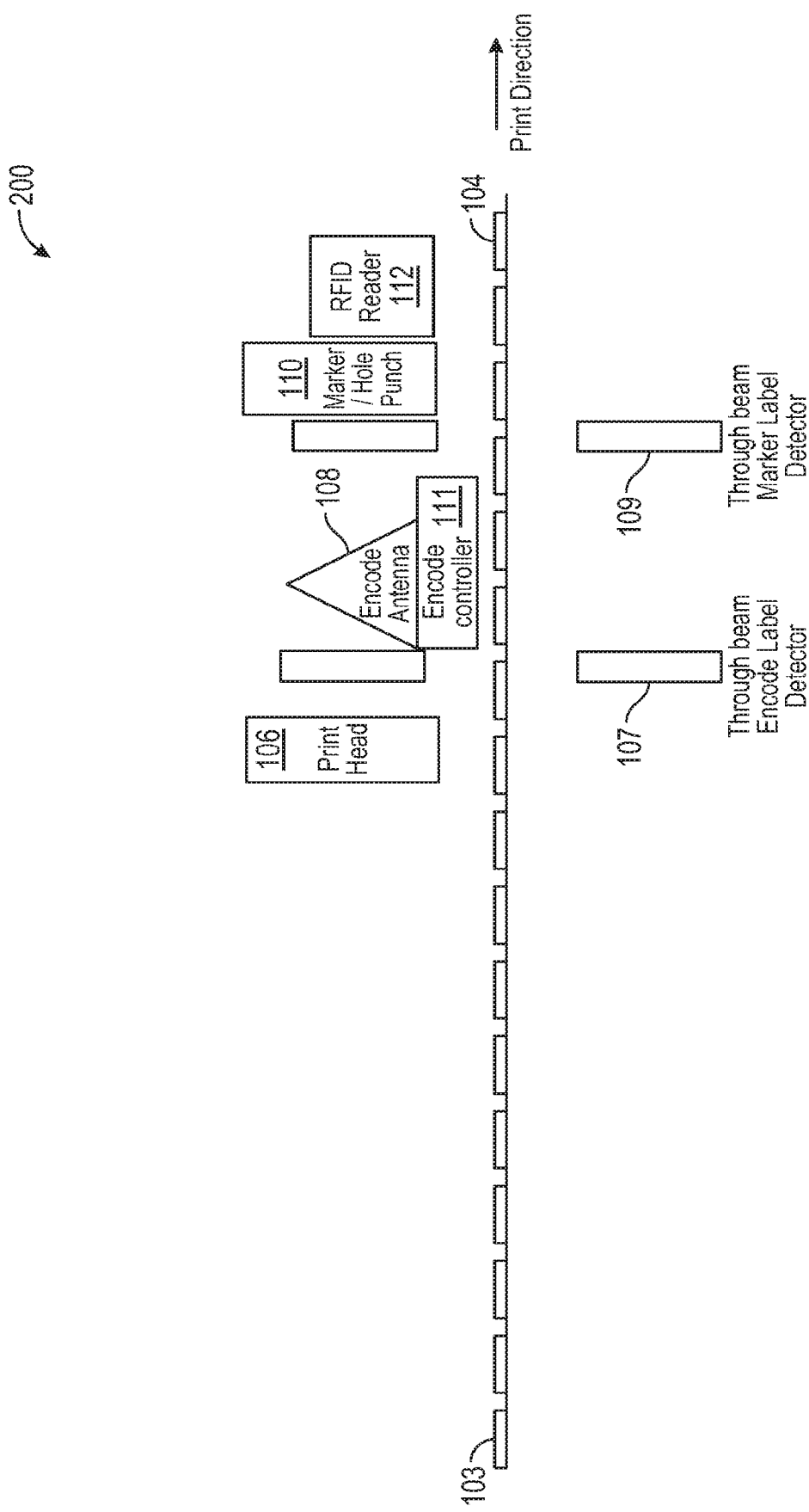
FIG. 2 is a schematic block diagram illustrating components of an exemplary RFID encoder interacting with RFID labels, in accordance with an implementation of the present disclosure.

FIG. 2 is a schematic block diagram 200 illustrating components of an exemplary RFID encoder interacting with RFID labels, in accordance with an implementation of the present disclosure. In this example, the RFID encoder comprises an RFID controller 111 that is coupled to a network, one or more antennas 108, a label detector 107, an RFID reader 112, a marker label detector 109, and a marker apparatus 110.

As unprinted labels 103 pass through a non-RFID label printer and the RFID encoder, the label detector 107 senses tags of the unprinted labels 103, and triggers the RFID controller 108 and a print head 106 of the non-RFID label printer to encode RFIDs onto the tags. In an event that encoding of a specific tag 104 is not successful, the marker label detector 109 can sense the specific tag, and cause the marker apparatus 110 to mark the specific tag. For example, the marker apparatus 110 might punch a hole in the specific tag.

Although only certain components are shown within the exemplary systems 100A, 100B and 200 in FIGS. 1A, 1B and 2, respectively, various types of electronic or computing components that are capable of processing or storing data, receiving or transmitting signals, or providing fresh air to downstream components, can also be included in the exemplary systems 100A, 100B and 200. Further, the electronic or computing components in the exemplary systems 100A, 100B and 200 can be configured to execute various types of application, and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for the exemplary systems 100A, 100B and 200, a variety of networking and messaging protocols can be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the exemplary systems 100A, 100B and 200 illustrated in FIGS. 1A, 1B and 2, respectively, are used for purposes of explanation. Therefore, a network system can be implemented with many variations, as appropriate, yet still provide a configuration of network platform in accordance with various examples of the present disclosure.

In exemplary configurations of FIGS. 1A, 1B and 2, respectively, the exemplary systems 100A, 100B and 200 can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well within the scope of various examples.

The above discussion is meant to be illustrative of the principles and various examples of the present disclosure. Numerous variations and modifications will become apparent once the above disclosure is fully appreciated.

Figure 3:
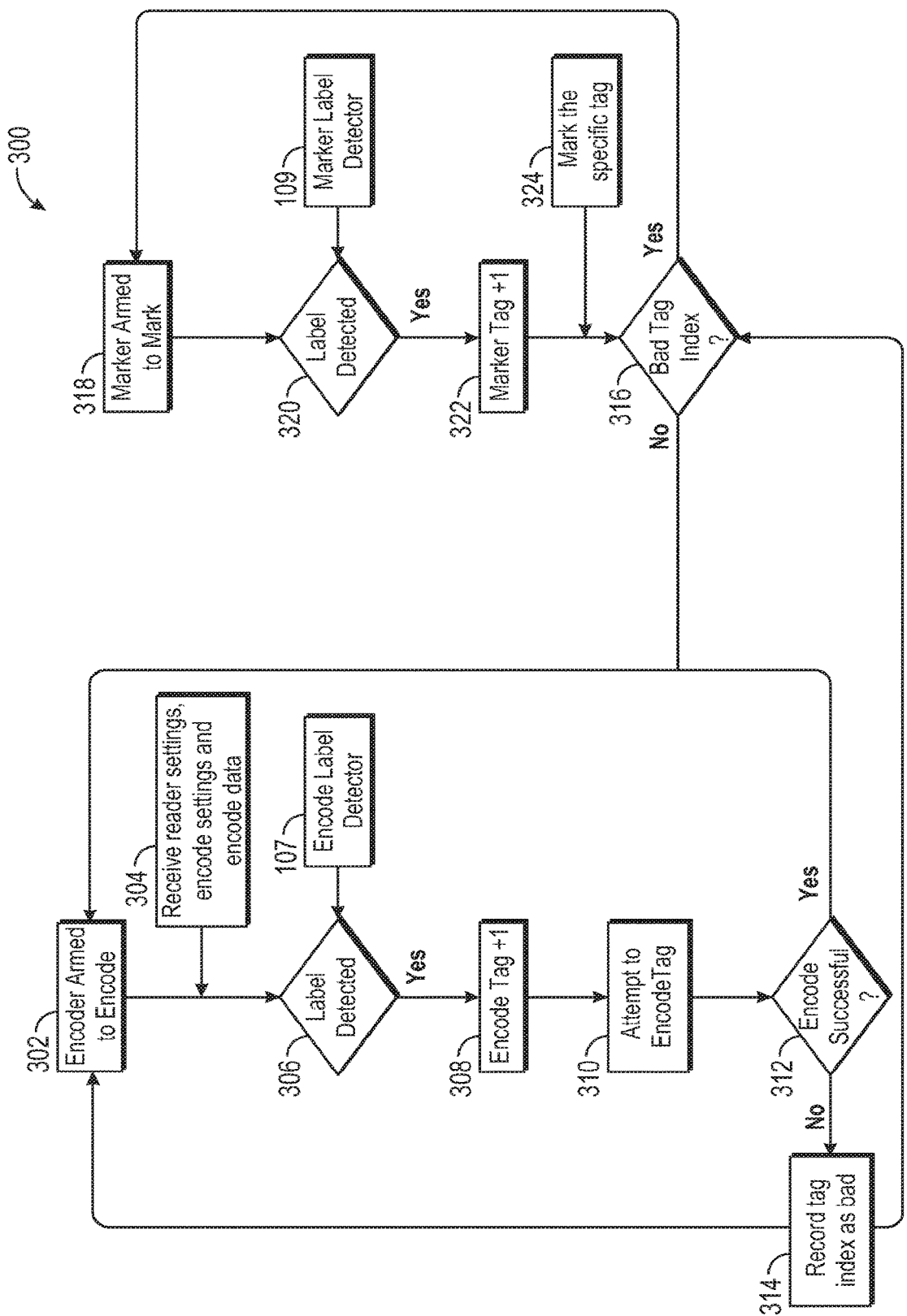
FIG. 3 is an exemplary method for generating RFID labels using a non-RFID label printer, in accordance with an implementation of the present disclosure.

FIG. 3 is an exemplary method 300 for generating RFID labels using a non-RFID label printer, in accordance with an implementation of the present disclosure. It should be understood that the exemplary method 300 is presented solely for illustrative purposes, and that in other methods in accordance with the present disclosure can include additional, fewer, or alternative steps performed in similar or alternative orders, or in parallel. The exemplary method 300 starts at step 302 by arming an RFID encoder. As illustrated above in FIGS. 1A, 1B and 2, the RFID encoder can comprise an RFID controller that is coupled to a network, one or more antennas, a label detector, an RFID reader, a marker label detector, and a marker apparatus.

At step 304, the RFID encoder can receive reader settings, encode settings and encode data via the one or more antennas, as illustrated in FIG. 2. The following Table 1 illustrates an example of user selected encode data and corresponding RFIDs received by the RFID encoder.

TABLE 1

| RFID label | Print | Encode |
|---|---|---|
| 1 | Pg. 1 | EPC1 |
| 2 | Pg. 2 | EPC2 |
| 3 | Pg. 3 | EPC3 |
| 4 | Pg. 4 | EPC4 |
|  |  | EPC5 |

At step 306, the encode label detector (e.g., the encode label detector 107 illustrated in FIG. 2) can sense a specific tag of unprinted labels. At step 308, the encoder controller can add one count to an encode tag count. At step 310, the encoder can encode the specific tag with a corresponding RFID based upon received encode data. The following Table 2 illustrates an example of encode data and corresponding RFIDs sent to the non-RFID label printer by the RFID encoder. In this example, encode data "EPC5" is removed to match print data while an encode data count is cut short to match a print data count and an RFID label count.

TABLE 2

| RFID label | Print | Encode |
|---|---|---|
| 1 | Pg. 1 | EPC1 |
| 2 | Pg. 2 | EPC2 |
| 3 | Pg. 3 | EPC3 |
| 4 | Pg. 4 | EPC4 |

Upon encoding, the encoder can further determine whether encoding of the specific tag is successful, at step 312. In an event that the encoding of the specific tag is successful, the method 300 goes back to step 302. In an event that the encoding of the specific tag is unsuccessful, the RFID encoder records a tag index of the specific tag as "bad," at step 314.

At step 316, the RFID encoder determines whether the specific tag has the tag index as "bad." In an event that the specific tag has the corresponding tag index recorded as "bad," the RFID encoder can arm the marker apparatus, at step 318. The marker label detector (e.g., the marker label detector 109 illustrated in FIG. 2) can sense the specific tag, at step 320.

At step 322, the encoder controller can add one count to a marker tag count. At step 324, the marker apparatus can mark the specific tag to indicate that the specific tag is bad.

In an event that the specific tag does not have a corresponding tag index recorded as "bad," the method 300 goes back to step 302.

Figure 4:
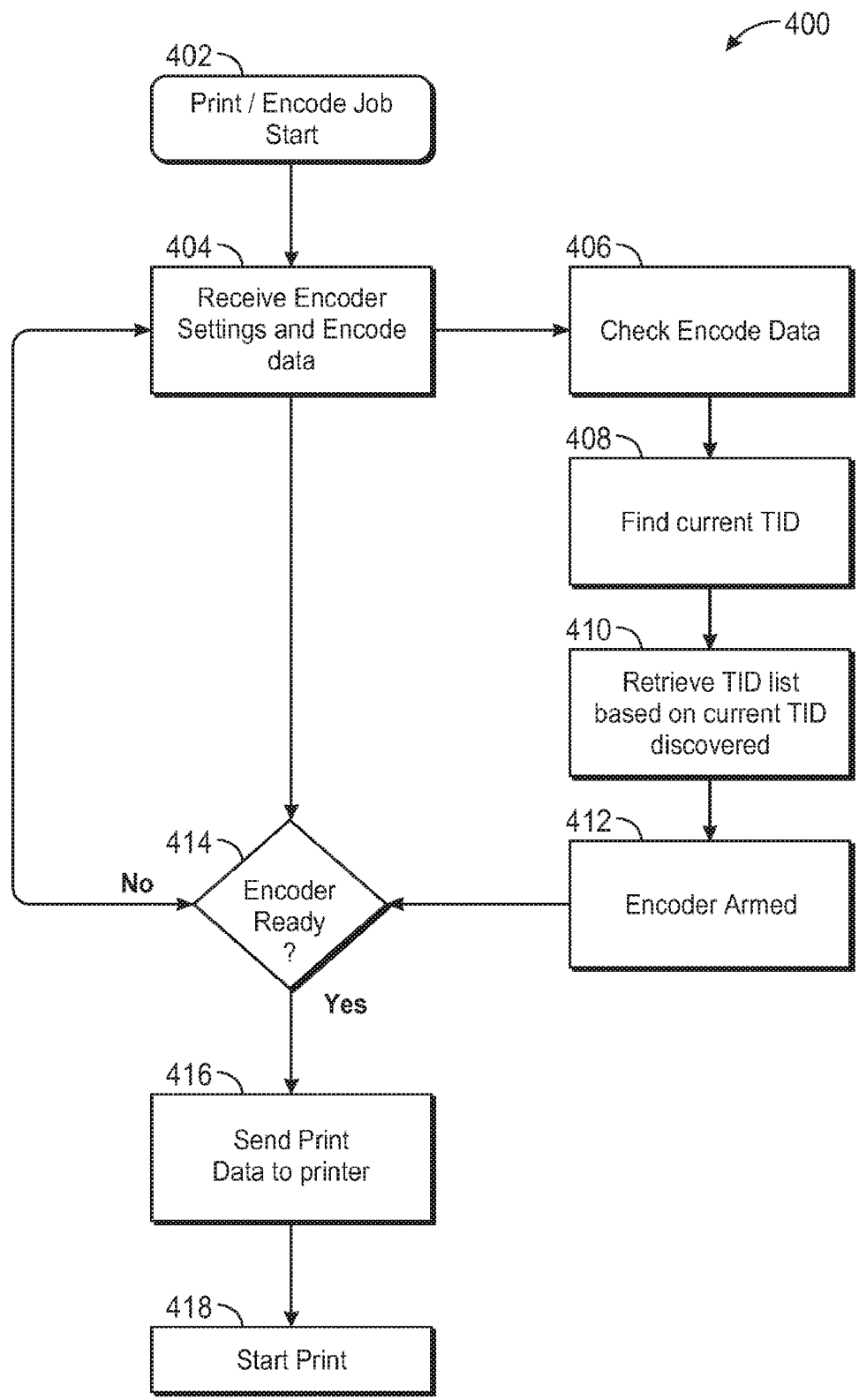
FIG. 4 is an exemplary method for synchronizing a non-RFID label printer and an exemplary RFID encoder, in accordance with an implementation of the present disclosure.

FIG. 4 is an exemplary method 400 for synchronizing a non-RFID label printer and an exemplary RFID encoder, in accordance with an implementation of the present disclosure. The exemplary method 400 starts at step 402 by starting a printing job. At step 404, an RFID controller of the RFID encoder receives encode settings and encode data via one or more antennas of the RFID encoder. In some examples, the RFID encoder can further comprise a label detector, an RFID reader, a marker label detector, and a marker apparatus.

At step 406, the RFID controller can check receive the encode data, and, determine a current tag sensed by the label detector. At step 408, the RFID controller can determine a corresponding TID of the current tag. At step 410, the RFID controller can retrieve a TID list based upon the TID of the current tag. In some implementations, the TID list can be stored on the RFID encoder. In some implementations, the TID list is stored on a server coupled to the network, or cloud.

At step 412, the RFID controller can cause the RFID encoder to be armed. At step 414, the RFID controller can cause the non-RFID label printer to wait until the RFID encoder is ready. In response to determine that the RFID encoder is ready, the RFID controller can send print data to the non-RFID label printer, at step 416, and cause the non-RFID label printer which is synchronized with the RFID encoder to start to print RFIDs, at step 418.

Figure 5:
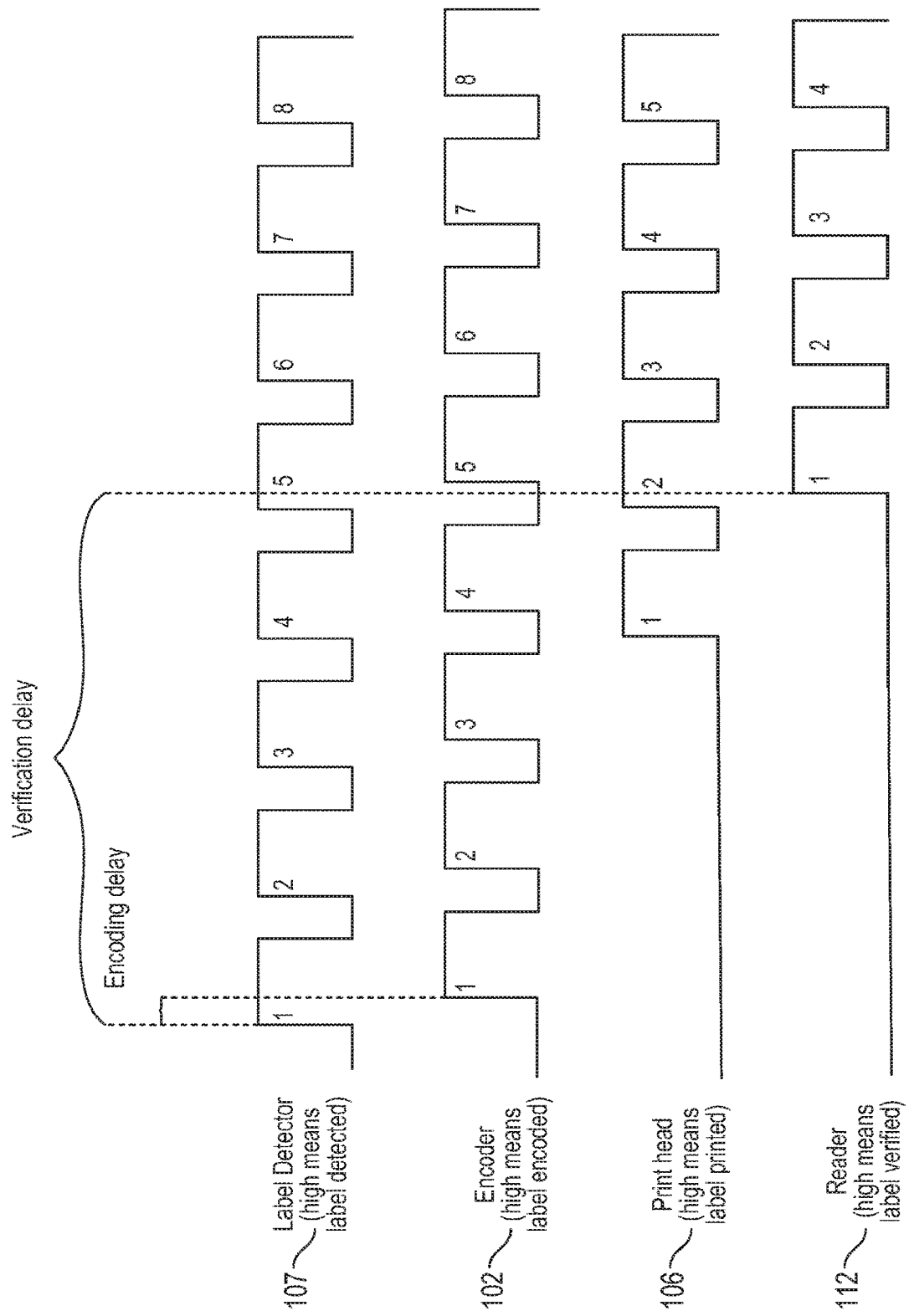
FIG. 5 illustrates an example of synchronizing a print head of a non-RFID label printer and an RFID reader of an RFID encoder, in accordance with an implementation of the present disclosure.

FIG. 5 illustrates an example of synchronizing a print head of a non-RFID label printer and an RFID reader of an RFID encoder, in accordance with an implementation of the present disclosure. In this example, the encoder 102 and the reader 112 are both triggered by the label detector 107. Synchronization between the print head and the RFID encoder can take into account of the encoding delay and the verification delay by the RFID encoder. In some implementations, the encoding delay and the verification delay can be calculated based upon sizes of tags to be encoded with RFIDs.

FIG. 7A-7D illustrate an example of TID-based encoding using an exemplary RFID encoder, in accordance with an implementation of the present disclosure. In this example, the RFID encoder relies on TID filtering to ensure accurate, singulated, and high speed encoding. Before printing/encoding begins, the RFID reader receives a list of every EPC to encode, which can be selected by user. When the job starts, the RFID encoder can detect and discover which tag (TID) is directly underneath the print head, and, subsequently, use that information to determine all next TID's to be expected. The RFID Encoder can use the list of TID's to encode each tag accurately, which ultimately leaves no chance for duplicate encoding, missed encoding, or a registration error in encoding.

Figure 7A:
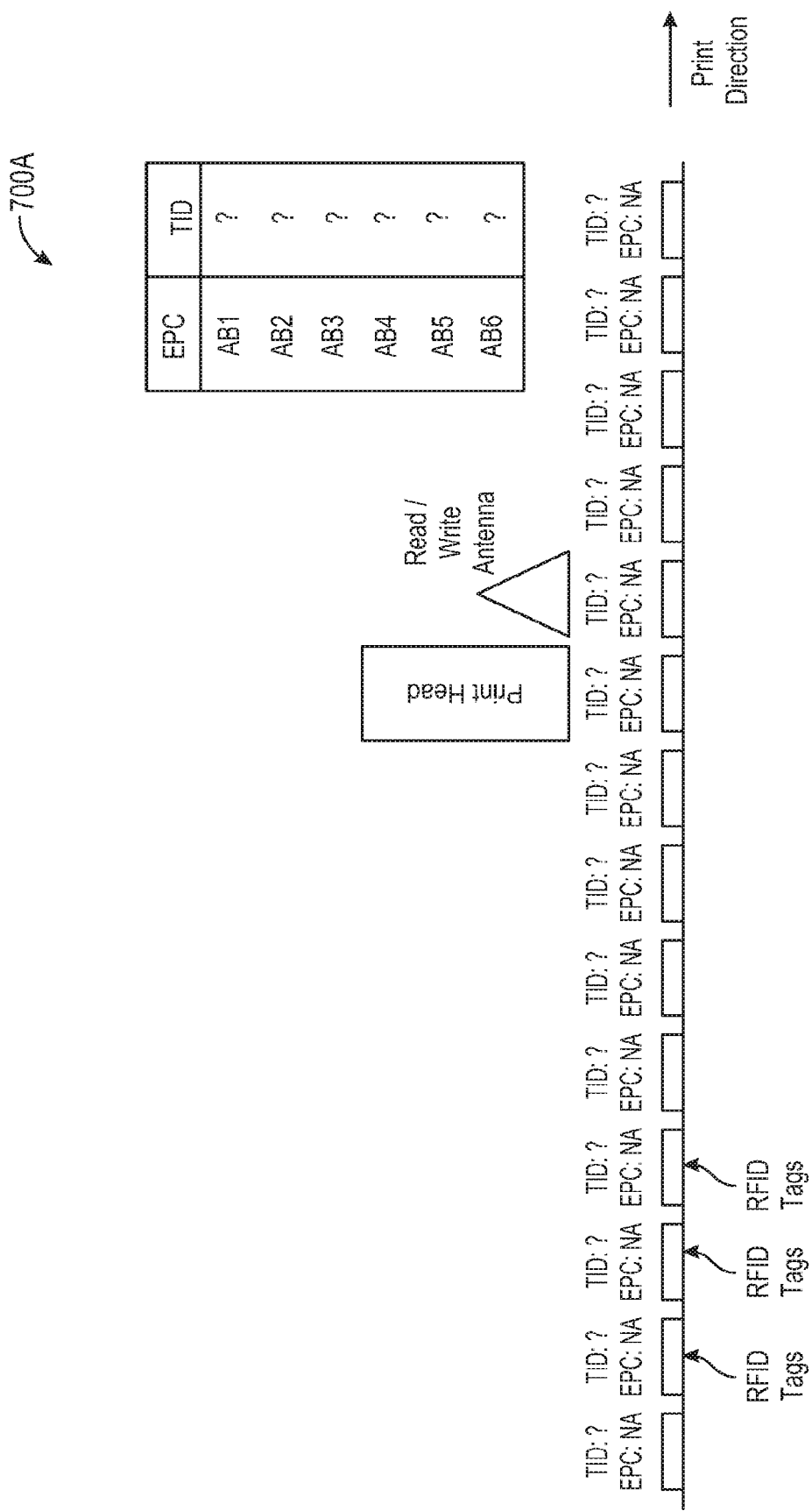
FIG. 7A-7D illustrate an example of TID-based encoding using an exemplary RFID encoder, in accordance with an implementation of the present disclosure.
Figure 7B:
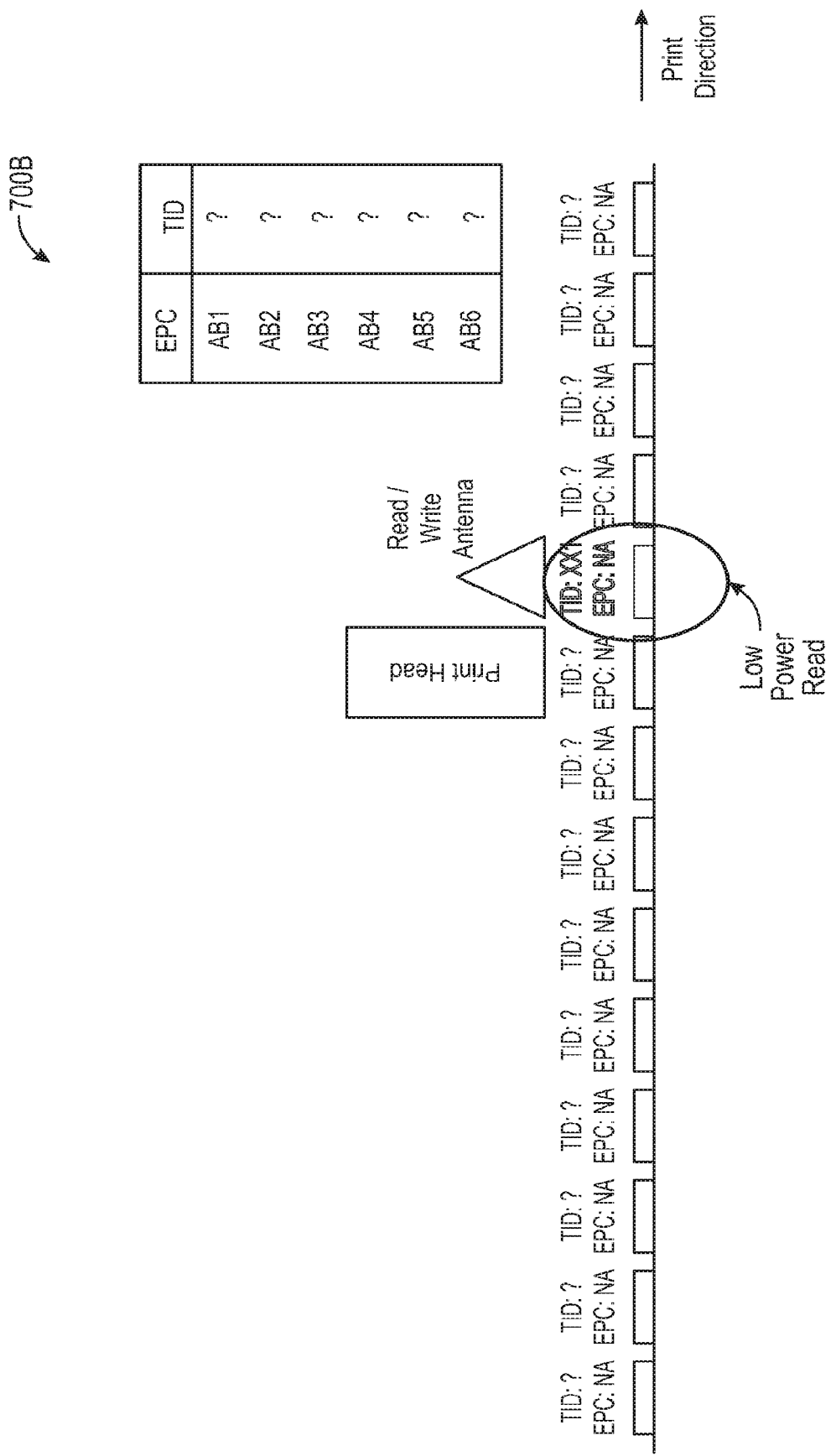
Figure 7C:
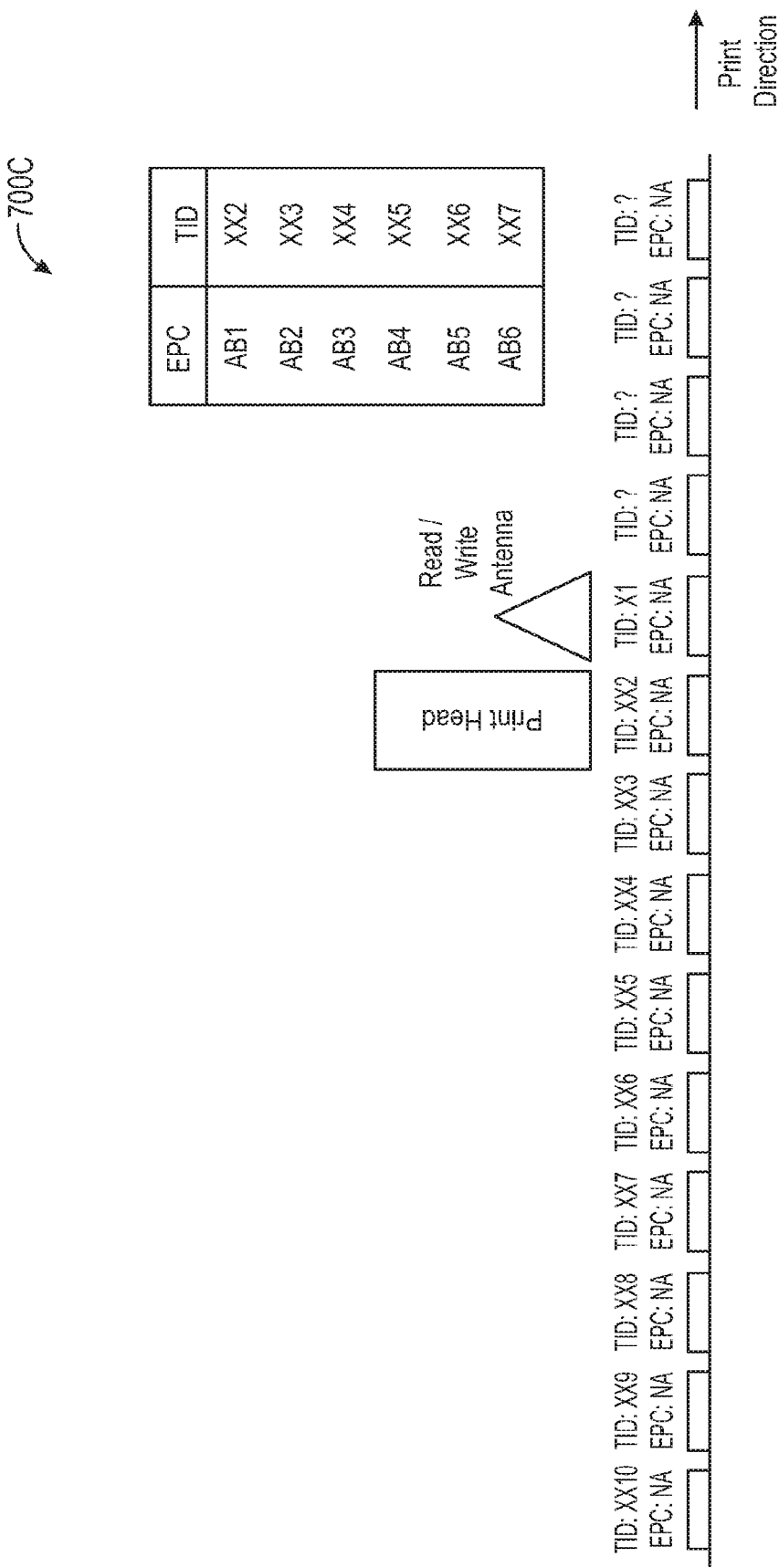
Figure 7D:
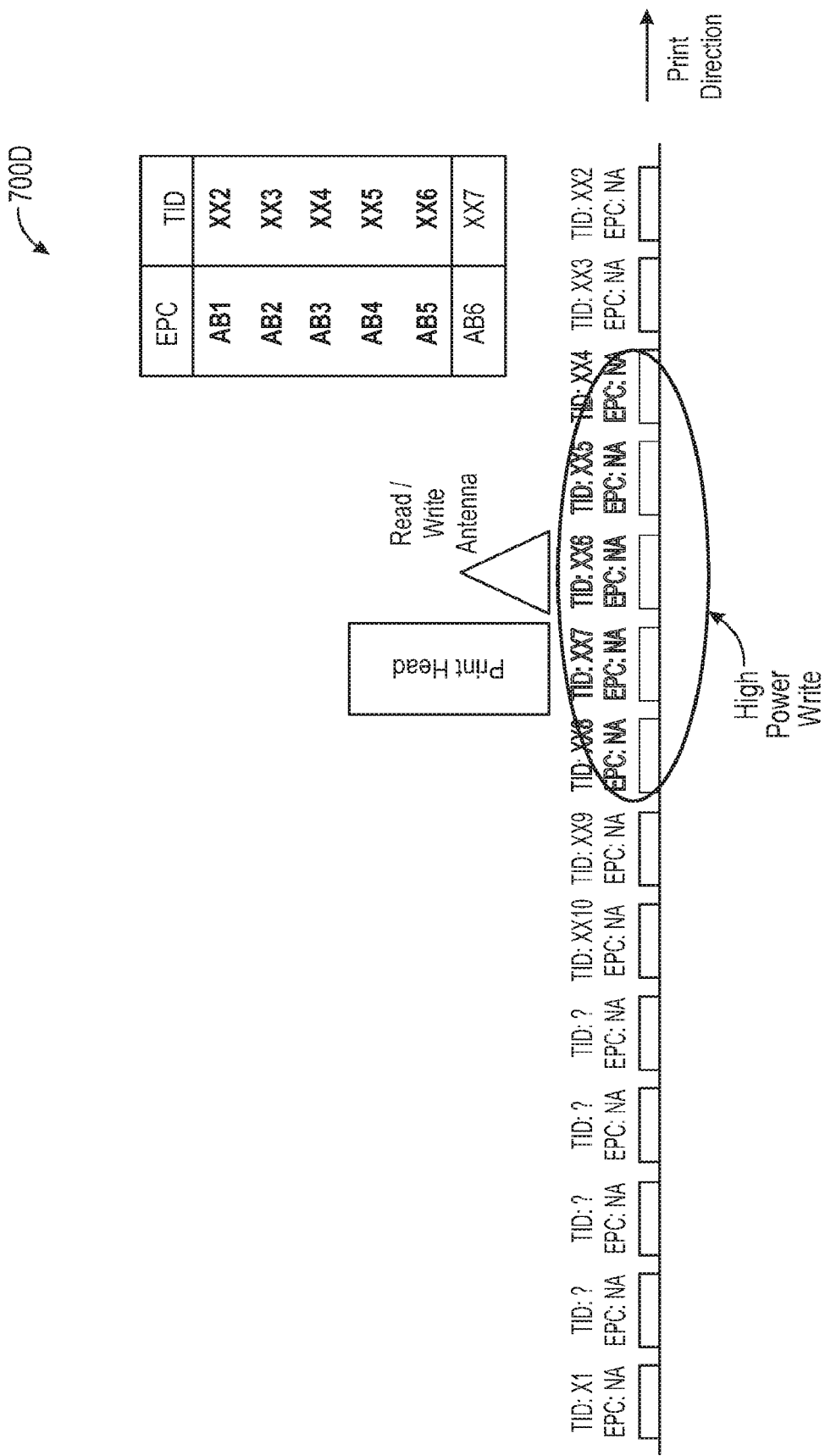

At step 1, Window app sends EPC data to the RFID encoder, which is illustrated in FIG. 7A. At step 2, the RFID encoder can detect and discover tag (TID) immediately under antenna by executing a lower power read, which is illustrated in FIG. 7B. At step 3, the RFID encoder can generate an EPC/TID matched encode list using discovered TID immediately under antenna, which is illustrated in FIG. 7C. At step 4, the RFID encoder can cause a label printer to start print/encode job, and encode each tag that passes using a TID filtered EPC encode, which is illustrated in FIG. 7D.

Figure 7E:
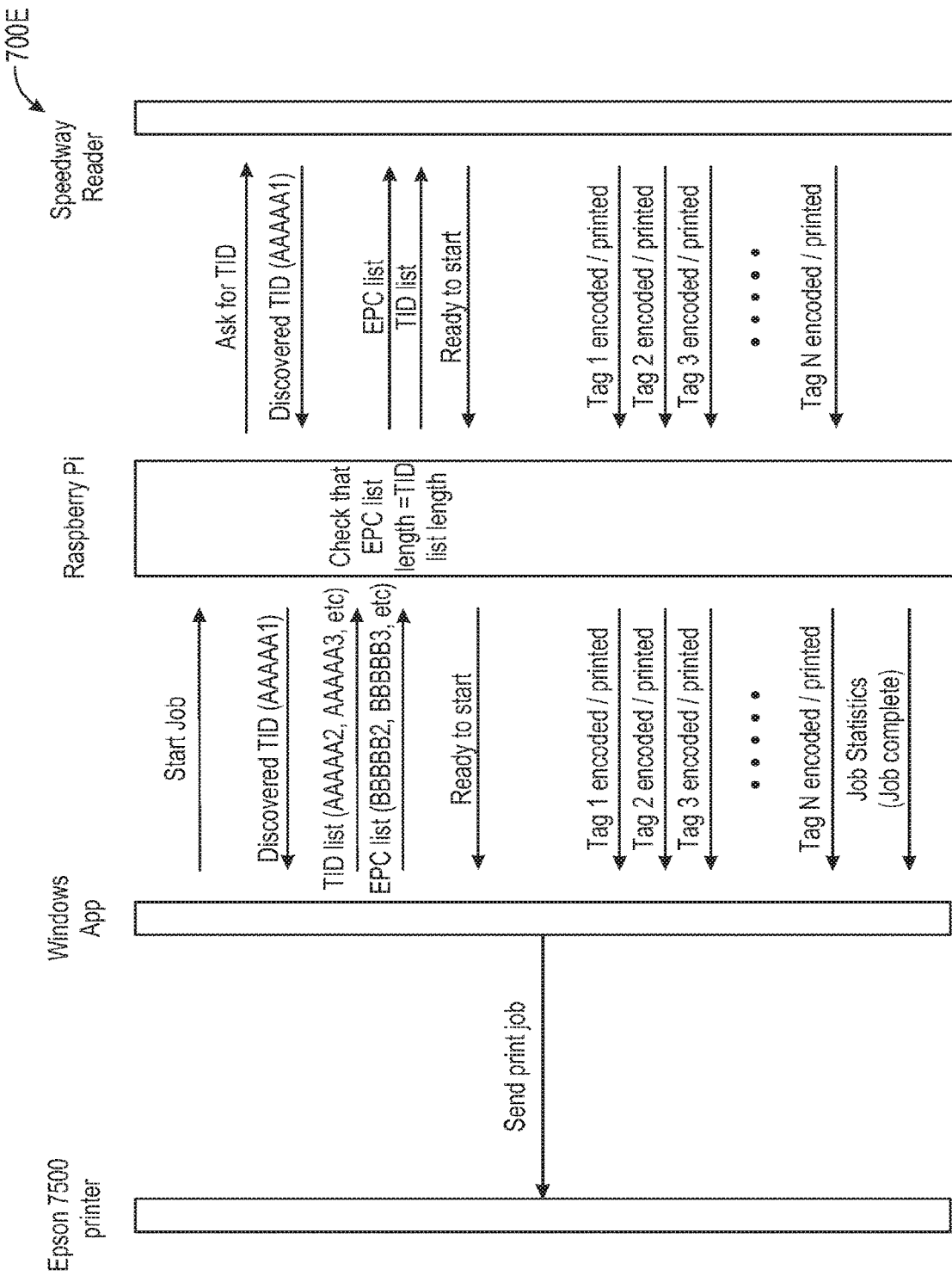
FIG. 7E illustrates an exemplary diagram of communications for synchronizing an Epson 7500™ and a speedway reader of an exemplary RFID encoder, in accordance with an implementation of the present disclosure.

FIG. 7E illustrates an exemplary diagram 700E of communications for synchronizing an Epson 7500™ and a speedway reader of an exemplary RFID encoder, in accordance with an implementation of the present disclosure.

Figure 7F:
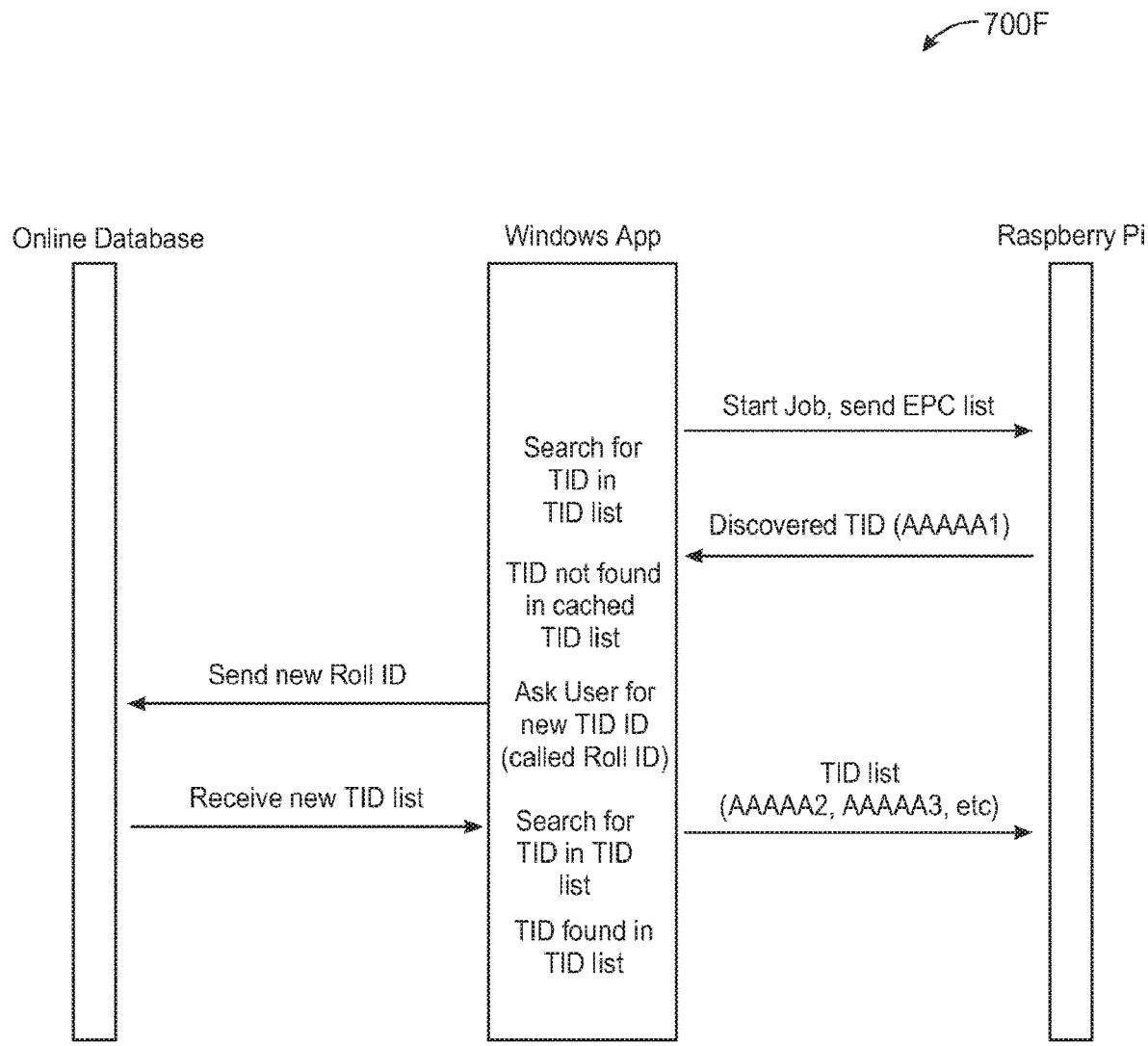
FIG. 7F illustrates an exemplary diagram of communications for fetching a new TID list using an exemplary RFID encoder, in an event that TID is not found in a cached TID list, in accordance with an implementation of the present disclosure.

FIG. 7F illustrates an exemplary diagram 700F of communications for fetching a new TID list using an exemplary RFID encoder, in an event that TID is not found in a cached TID list, in accordance with an implementation of the present disclosure.

Figure 6:
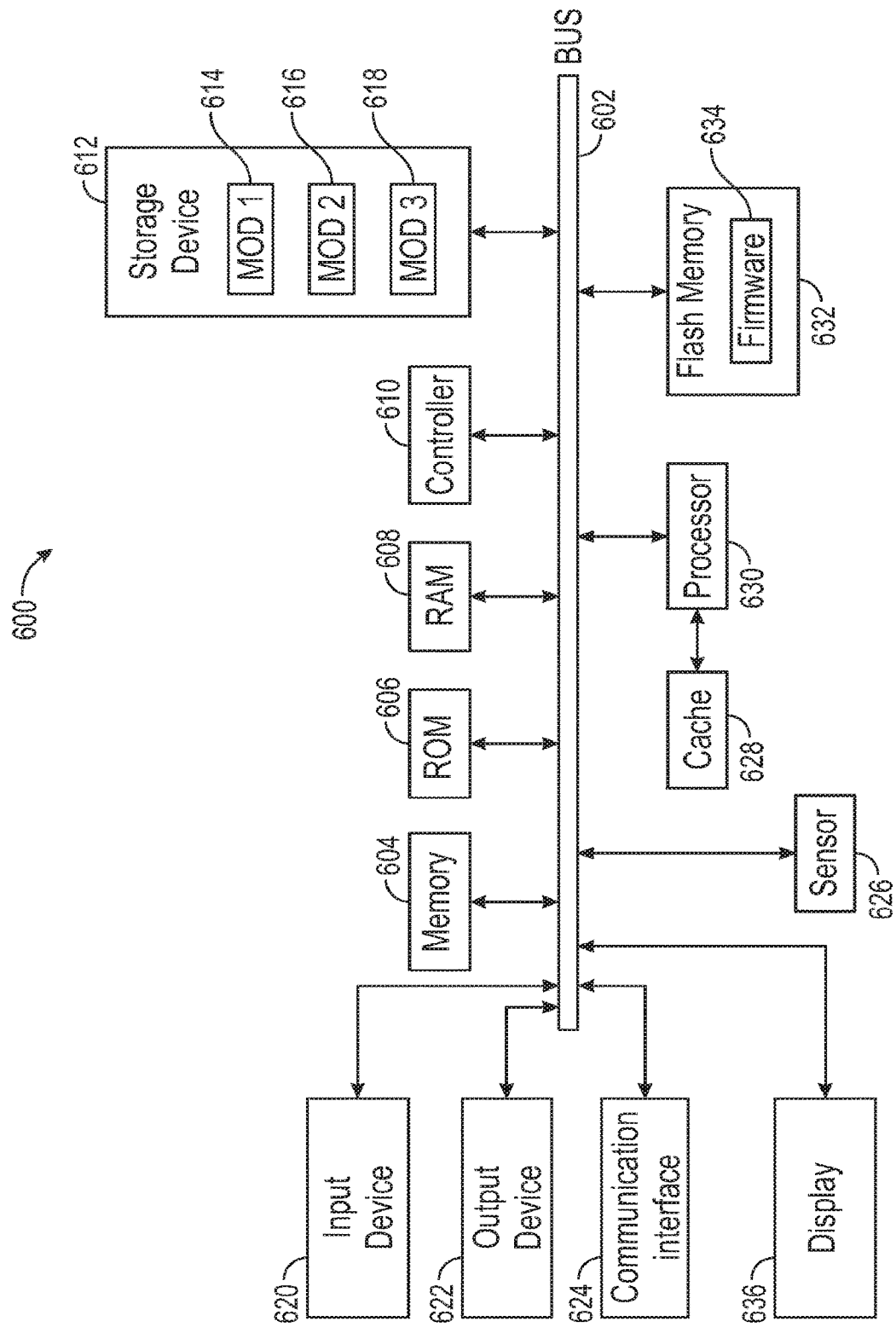
FIG. 6 illustrates an exemplary system, in accordance with various examples of the present disclosure.

A brief introductory description of example systems and networks, as illustrated in FIG. 6, is disclosed herein. These variations shall be described herein as the various examples are set forth. The present disclosure now turns to FIG. 6.

FIG. 6 illustrates an example computing system 600, in which components of the computing system are in electrical communication with each other using a bus 602. The system 600 includes a processing unit (CPU or processor) 630, and a system bus 602 that couples various system components, including the system memory 604 (e.g., read only memory (ROM) 606 and random access memory (RAM) 608), to the processor 630. The system 600 can include a cache of high-speed memory connected directly with, in close proximity to, or integrated as part of the processor 630. The system 600 can copy data from the memory 604 and/or the storage device 612 to the cache 628 for quick access by the processor 630. In this way, the cache can provide a performance boost for processor 630 while waiting for data. These and other modules can control or be configured to control the processor 630 to perform various actions. Other system memory 304 may be available for use as well. The memory 604 can include multiple different types of memory with different performance characteristics. The processor 630 can include any general purpose processor and a hardware module or software module, such as module 1 614, module 2 616, and module 3 618 embedded in storage device 612. The hardware module or software module is configured to control the processor 630, as well as a special-purpose processor where software instructions are incorporated into the actual processor design. The processor 630 may essentially be a completely self-contained computing system, and containing multiple cores or processors, a bus, memory controller, cache, etc. A multi-core processor may be symmetric or asymmetric.

To enable user interaction with the computing device 600, an input device 620 is provided as an input mechanism. The input device 620 can comprise a microphone for speech, a touch-sensitive screen for gesture or graphical input, keyboard, mouse, motion input, and so forth. In some instances, multimodal systems can enable a user to provide multiple types of input to communicate with the system 300. In this example, an output device 622 and a display 636 are also provided. The communications interface 624 can govern and manage the user input and system output.

Storage device 612 can be a non-volatile memory to store data that are accessible by a computer. The storage device 612 can be magnetic cassettes, flash memory cards, solid state memory devices, digital versatile disks, cartridges, random access memories (RAMs) 608, read only memory (ROM) 306, and hybrids thereof.

The controller 610 can be a specialized microcontroller or processor on the system 600, such as a baseboard management controller. In some cases, the controller 610 can be part of an Intelligent Platform Management Interface (IPMI). Moreover, in some cases, the controller 610 can be embedded on a motherboard or main circuit board of the system 600. The controller 610 can manage the interface between system management software and platform hardware. The controller 610 can also communicate with various system devices and components (internal and/or external), such as controllers or peripheral components, as further described below.

The controller 610 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 610 to initiate or conduct specific hardware recovery procedures or operations, as further described below.

The controller 610 can also include a system event log controller and/or storage for managing and maintaining events, alerts, and notifications received by the controller 610. For example, the controller 610 or a system event log controller can receive alerts or notifications from one or more devices and components, and maintain the alerts or notifications in a system event log storage component.

Flash memory 632 can be an electronic non-volatile computer storage medium or chip that can be used by the system 600 for storage and/or data transfer. The flash memory 632 can be electrically erased and/or reprogrammed. Flash memory 632 can include EPROM (erasable programmable read-only memory), EEPROM (electrically erasable programmable read-only memory), ROM, NVRAM, or CMOS (complementary metal-oxide semiconductor), for example. The flash memory 632 can store the firmware 634 executed by the system 600, when the system 600 is first powered on, along with a set of configurations specified for the firmware 634. The flash memory 632 can also store configurations used by the firmware 634.

The firmware 634 can include a Basic Input/Output System or equivalents, such as an EFI (Extensible Firmware Interface) or UEFI (Unified Extensible Firmware Interface). The firmware 634 can be loaded and executed as a sequence program each time the system 600 is started. The firmware 634 can recognize, initialize, and test hardware present in the system 600 based on the set of configurations. The firmware 634 can perform a self-test, such as a POST (Power-on-Self-Test), on the system 600. This self-test can test functionality of various hardware components such as hard disk drives, optical reading devices, cooling devices, memory modules, expansion cards, and the like. The firmware 634 can address and allocate an area in the memory 604, ROM 606, RAM 608, and/or storage device 612, to store an operating system (OS). The firmware 634 can load a boot loader and/or OS, and give control of the system 600 to the OS.

The firmware 634 of the system 600 can include a firmware configuration that defines how the firmware 634 controls various hardware components in the system 600. The firmware configuration can determine the order in which the various hardware components in the system 600 are started. The firmware 334 can provide an interface, such as an UEFI, that allows a variety of different parameters to be set, which can be different from parameters in a firmware default configuration. For example, a user (e.g., an administrator) can use the firmware 634 to specify clock and bus speeds; define what peripherals are attached to the system 600; set monitoring of health (e.g., fan speeds and CPU temperature limits); and/or provide a variety of other parameters that affect overall performance and power usage of the system 600. While firmware 634 is illustrated as being stored in the flash memory 632, one of ordinary skill in the art will readily recognize that the firmware 634 can be stored in other memory components, such as memory 604 or ROM 606.

System 600 can include one or more sensors 626. The one or more sensors 626 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 626 can communicate with the processor, cache 628, flash memory 632, communications interface 624, memory 604, ROM 606, RAM 608, controller 610, and storage device 612, via the bus 602, for example. The one or more sensors 626 can also communicate with other components in the system via one or more different means, such as inter-integrated circuit (I2C), general purpose output (GPO), and the like. Different types of sensors (e.g., sensors 626) on the system 600 can also report to the controller 610 on parameters, such as cooling fan speeds, power status, operating system (OS) status, hardware status, and so forth.

It can be appreciated that example system 600 can have more than one processor (e.g., 630), or be part of a group or cluster of computing devices networked together to provide greater processing capability.

For clarity of explanation, in some instances, the present disclosure may be presented as including individual functional blocks including functional blocks, including devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used, can be accessible over a network. The computer executable instructions may be, for example, binaries and intermediate format instructions, such as assembly language, firmware, or source code.

Devices implementing methods according to these disclosures can include hardware, firmware and/or software, and can take any of a variety of form factors. Typical examples of such form factors include laptops, smart phones, small form factor personal computers, personal digital assistants, rack-mount devices, standalone devices, and so on. Functionality described herein also can be embodied in peripherals or add-in cards. Such functionality can also be implemented on a circuit board among different chips, or different processes executing in a single device, by way of further example.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless, and handheld devices running mobile software, and capable of supporting a number of networking and messaging protocols. Such a system can also include a number of workstations running any of a variety of commercially-available operating systems, and other known applications for purposes such as development and database management. These devices can also include other electronic devices, such as dummy terminals, thin-clients, gaming systems, and other devices capable of communicating via a network.

To the extent examples, or portions thereof, are implemented in hardware, the present disclosure can be implemented with any, or a combination of, the following technologies: a discrete logic circuit(s) having logic gates for implementing logic functions upon data signals; an application specific integrated circuit (ASIC) having appropriate combinational logic gates; programmable hardware such as a programmable gate array(s) (PGA); and/or a field programmable gate array (FPGA); etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network, and any combination thereof.

Devices implementing methods, according to these technologies, can include hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips, or different processes executing in a single device, by way of further example.

In examples that utilize a Web server, the Web server can run any variety of server or mid-tier applications, including HTTP servers, FTP servers, CGI servers, data servers, Java servers, and business application servers. In response to requests from user devices, the Web server(s) can also be capable of executing programs or scripts. For example, the Web server can execute one or more Web applications, which can be implemented as one or more scripts or programs written in any programming language, such as Java®, C, C# or C++ or any scripting language, such as Perl, Python or TCL, as well as combinations thereof. The Web server(s) can also encompass database servers, including those commercially available on the open market.

The system can include a variety of data stores and other memory and storage media, as discussed above. These can reside in a variety of locations, such as on a storage medium local to (and/or resident in) one or more of the computers, or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad), and at least one output device (e.g., a display device, printer or speaker). Such a system can also include one or more storage devices, such as disk drives, optical storage devices, and solid-state storage devices such as random access memory (RAM) or read-only memory (ROM), as well as removable media devices, memory cards, flash cards, etc.

Storage media and computer readable media for containing code, or portions of code, can include any appropriate media known or used in the art, including storage media and computing media. The storage media and computing media can include, but are not limited to, removable and non-removable media for storage and/or transmission of data or information. The removable and non-removable media comprise RAM, ROM, EPROM, EEPROM, flash memory or other memory technology, CD-ROM, digital versatile disk (DVD) or other optical storage, magnetic cassettes, magnetic tape, magnetic disk storage, or other magnetic storage devices that can be used to store the desired information and that can be accessed by a system device. The data or information can include computer readable instructions, data structures, program modules, or other data. Based on the technology and teachings provided herein, a person of ordinary skill in the art will appreciate other ways and/or methods to implement the various aspects of the present disclosure.

The specification and drawings are, accordingly, to be regarded in an illustrative rather than a restrictive sense. It will, however, be evident that various modifications and changes can be made thereunto without departing from the broader spirit and scope of the patent application, as set forth in the claims.

What is claimed is:

1. A computer-implemented method for generating RFID labels using a non-RFID label printer, comprising:
    causing an RFID encoder to be armed, the RFID encoder attached to the non-RFID label printer, the RFID encoder comprising an RFID controller, one or more antennas, a label detector, and an RFID reader;
    receiving, via the one or more antennas, reader settings, encode settings, and encode data;
    sensing, using the label detector, a specific tag of unprinted labels;
    encoding the specific tag with a corresponding RFID based upon the encode data;
    determining that the encoding of the specific tag is not successful;
    recording a tag index of the specific tag as bad; and
    initiating a bad label process.

2. The computer-implemented method of claim 1, wherein the RFID encoder further comprises a marker label detector, and a marker apparatus.

3. The computer-implemented method of claim 2, wherein the marker apparatus is a hole punch apparatus.

4. The computer-implemented method of claim 2, further comprising:
    determining the tag index of the specific tag is bad;
    causing the marker apparatus to be armed;
    sensing the specific tag via the marker label detector; and
    marking the specific tag using the marker apparatus.

5. The computer-implemented method of claim 1, further comprising:
    checking the encode data to determine a corresponding tag ID (TID) of a current tag sensed by the label detector;
    retrieving a TID list based upon the current TID;
    arming the RFID encoder; and
    upon the RFID encoder being armed, sending print data to the non-RFID label printer to generate the RFID labels.

6. The computer-implemented method of claim 1, wherein the RFID encoder is attached to the non-RFID label printer via one or more clips, the one or more clips configured to accommodate at least one physical feature of the non-RFID label printer.

7. The computer-implemented method of claim 6, wherein the one or more clips are adapted to a rear feed lip of the non-RFID label printer, a front exit lip of the non-RFID label printer, and/or expansion ports of the non-RFID label printer.

8. The computer-implemented method of claim 1, wherein the RFID encoder includes multiple RFID readers, the RFID readers embedded in a label unwinder or rewinder of the non-RFID label printer.

9. A system, comprising:
    a processor; and
    a computer-readable medium storing instructions that, when executed by the processor, cause the system to perform operations comprising:

causing an RFID encoder to be armed, the RFID encoder attached to a non-RFID label printer, the RFID encoder comprising an RFID controller, one or more antennas, a label detector, and an RFID reader;

receiving, via the one or more antennas, reader settings, encode settings, and encode data;

sensing, using the label detector, a specific tag of unprinted labels;

encoding the specific tag with a corresponding RFID based upon the encode data;

determining that the encoding of the specific tag is not successful;

recording a tag index of the specific tag as bad; and initiating a bad label process.

10. The system of claim 9, wherein the RFID encoder further comprises a marker label detector, and a marker apparatus.

11. The system of claim 10, wherein the marker apparatus is a hole punch apparatus.

12. The system of claim 10, wherein the computer-readable medium storing instructions that, when executed by the processor, further cause the system to perform operations comprising:

determining the tag index of the specific tag is bad;

causing the marker apparatus to be armed;

sensing the specific tag via the marker label detector; and marking the specific tag using the marker apparatus.

13. The system of claim 9, wherein the computer-readable medium storing instructions that, when executed by the processor, further cause the system to perform operations comprising:

checking the encode data to determine a corresponding tag ID (TID) of a current tag sensed by the label detector;

retrieving a TID list based upon the current TID;

arming the RFID encoder; and upon the RFID encoder being armed, sending print data to the non-RFID label printer to generate the RFID labels.

14. The system of claim 9, wherein the RFID encoder is attached to the non-RFID label printer via one or more clips, the one or more clips configured to accommodate at least one physical feature of the non-RFID label printer.

15. The system of claim 14, wherein the one or more clips are adapted to a rear feed lip of the non-RFID label printer, a front exit lip of the non-RFID label printer, and/or expansion ports of the non-RFID label printer.

16. The system of claim 9, wherein the RFID encoder includes multiple RFID readers, the RFID readers embedded in a label unwinder or rewinder of the non-RFID label printer.

17. A non-transitory computer-readable storage medium including instructions that, when executed by at least one processor of a system, cause the system to perform operations comprising:

causing an RFID encoder to be armed, the RFID encoder attached to a non-RFID label printer, the RFID encoder comprising an RFID controller, one or more antennas, a label detector, and an RFID reader;

receiving, via the one or more antennas, reader settings, encode settings, and encode data;

sensing, using the label detector, a specific tag of unprinted labels;

encoding the specific tag with a corresponding RFID based upon the encode data;

determining that the encoding of the specific tag is not successful;

recording a tag index of the specific tag as bad; and initiating a bad label process.

18. The non-transitory computer-readable storage medium of claim 17, wherein the RFID encoder further comprises a marker label detector, and a marker apparatus.

19. The non-transitory computer-readable storage medium of claim 18, wherein the instructions, when executed by the at least one processor of the system, further cause the system to perform operations comprising:

determining the tag index of the specific tag is bad;

causing the marker apparatus to be armed;

sensing the specific tag via the marker label detector; and marking the specific tag using the marker apparatus.

20. The non-transitory computer-readable storage medium of claim 17, wherein the instructions, when executed by the at least one processor of the system, further cause the system to perform operations comprising:

checking the encode data to determine a corresponding tag ID (TID) of a current tag sensed by the label detector;

retrieving a TID list based upon the current TID;

arming the RFID encoder; and upon the RFID encoder being armed, sending print data to the non-RFID label printer to generate the RFID labels.

* * * * *